3,009,100
ASCERTAINING SURFACE CONDITION
Samuel N. Muchnick, Los Angeles, Calif., assignor to the United States of America as represented by the Secretary of the Air Force
Filed Mar. 18, 1958, Ser. No. 722,360
2 Claims. (Cl. 324—54)

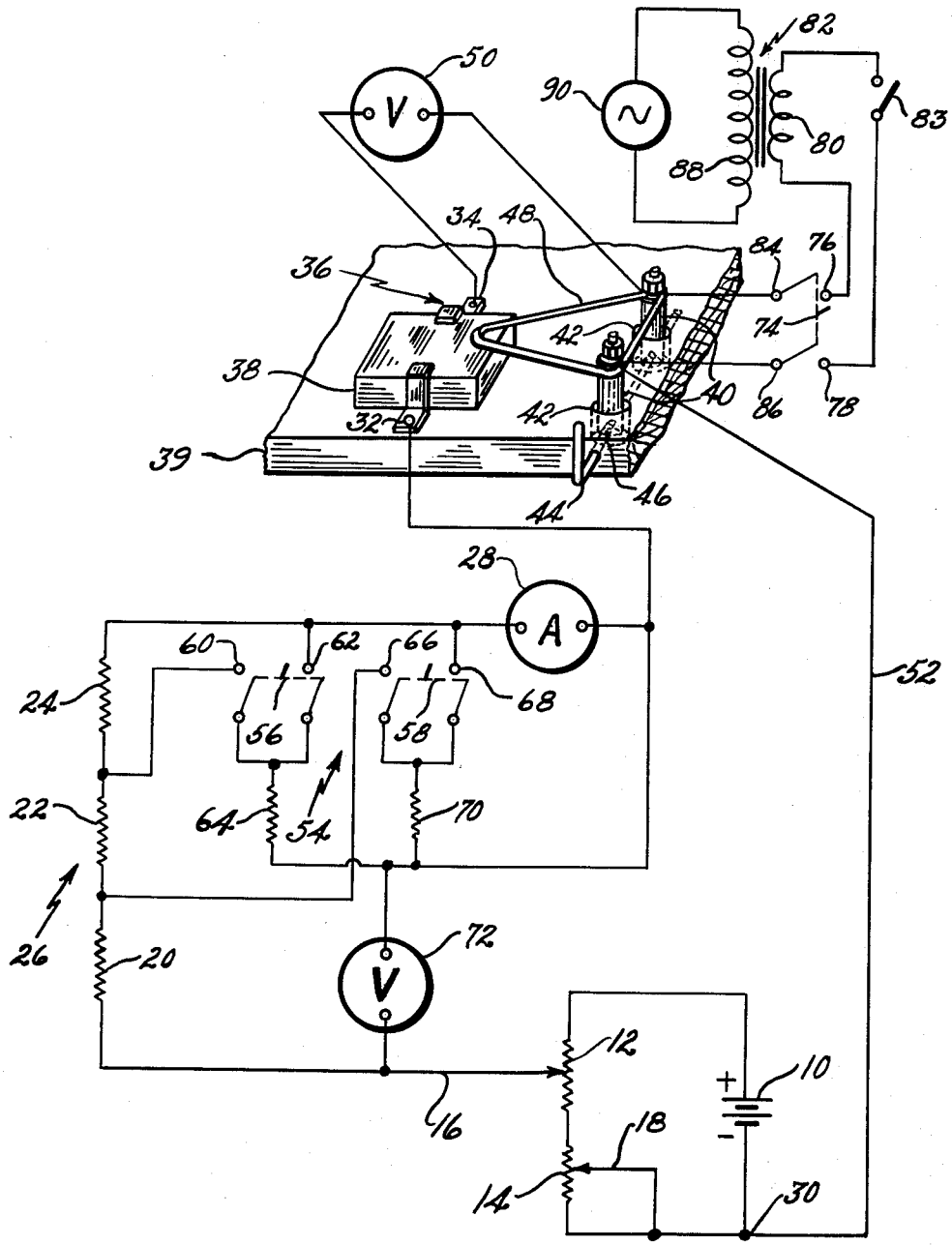

This invention relates to the determination of the surface condition of a body, and particularly to a method for determining the surface condition of an electrically-conductive body by measuring the voltage required to have current flow between the body and another body displaced therefrom by a dielectric medium.

Reliable data concerning the surface condition of a body is an important consideration in being able to achieve optimum processing of the body by the application of a coating, solder, plating or adhesive bonding medium to joint one body to another. Qualitative data of surface condition is particularly desirable for processing metallic bodies since they show an affinity for developing oxides and readily form a base for organic contamination. Generally, before metallic bodies are subjected to further processing they are cleaned by a suitable method which is usually effective in removing organic films; however, unless cleaned bodies can be subjected to a reliable qualitative test there is no way of ascertaining the degree to which the cleaning process has removed objectionable oxides. Without a reliable qualitative test it can be expected that in a quantity of identical metallic bodies subjected to the same cleaning and treatment a percentage of the finished product will exhibit undesirable characteristics. For example, some coatings or bonds will not be as optimumly adhered to the metallic bodies as others subjected to the same processing. Additionally, since unpredictable results are obtained, more often than not, a destructive test is required to ascertain the cause of failure.

It is an object of the present invention to describe a method for qualitatively determining the surface condition of metallic bodies prior to treatment. Thus, an optimum standard can be established for cleaning all bodies prior to further processing and those bodies not meeting the standard can be rejected and subjected to further cleaning. Additionally, it is an object of the present invention to eliminate, as a cause of any unpredictability occurring in the finished product, the failure due to improper treatment of the metallic body prior to processing. Failure of optimum processing can thus be narrowed in scope to the process, as for example, to the adhesive employed and the cure to which it is subjected for bonding one metal to another. It is another object to describe a qualitative test that is not destructive of the material being tested.

Accordingly, the surface condition of a metallic body may be ascertained by incorporating the body into an electrical circuit having a suitable voltage source connected thereto and by moving an electrically conductive element toward the body to allow current to flow between the body and the element, completing the circuit to the source, or by varying the magnitude of the applied voltage to have this occur. The magnitude of voltage required to have current flow in the circuit, when breakdown of the dielectric medium between the body and the element occurs, is used as an indication of the surface condition of the body.

These and other objects and features of the present invention will best be understood from the following description taken in conjunction with the accompanying drawing which depicts an apparatus for measuring the surface condition of a metallic body.

Referring to the drawing there is shown a voltage source 10, having variable resistors 12 and 14 connected in shunt therewith. A wiper arm 16 of the variable resistor 12 is the coarse voltage adjustment and a wiper arm 18 of the variable resistor 14 is the fine voltage adjustment. The wiper arm 16 is connected to one side of a resistor 20, which together with serially connected resistors 22 and 24 forms a voltage divider 26. One terminal of an ammeter 28 is connected to the resistor 24. The wiper arm 18 of the resistor 14 is connected to a common point 30 to the negative terminal of the source. Another terminal of the ammeter 28 is connected to a terminal 32, which together with another terminal 34 may be referred to as an electrically-conductive clamping device 36 for securing a body 38 in place on a mounting surface 39 for test purposes. A pair of stand-off terminals 40, inserted into a pair of spaced openings 42 in the mounting surface 39, are ganged to move together in the openings by attachment of a shaft 44 thereto. The shaft extends through an opening 46 in a side of the mounting surface which intercepts the openings 42 and the shaft is frictionally positioned in the openings. An electrically conductive element 48, which may conveniently be a platinum loop, is affixed to the terminals 40, and is positioned over the body 38 to have air as the dielectric medium therebetween. Movement of the shaft 44 enables the element 48 to be positioned with respect to the body 38, thus, controlling the electrical strength of the dielectric medium therebetween.

A voltmeter 50 may be connected between the terminal 34 and one of the terminals 40, for measuring the voltage between the body and the loop just prior to breakdown of the dielectric medium, as will be explained more fully subsequently. The voltmeter may preferably be a vacuum-tube voltmeter. A lead 52 connected to a terminal 40 and to the common point, completes the circuit for current to flow to common point 30 through the voltage divider 26, the ammeter 28, the body 38, and the voltmeter 50.

Selecting means 54 including two double-pole, double-throw switches 56 and 58 and associated circuitry are provided for applying current through various loads in order to add versatility to the apparatus, whereby a variety of bodies may be tested with a single apparatus. Contacts 60 and 62 of the switch 56 are connected across the resistor 24 so that the voltage appearing across resistors 20 and 22, depending on the settings of wiper arms 16 and 18, can be applied through a resistor 64 to the body 38. Similarly, contacts 66 and 68 of the switch 58 are connected across the resistors 22 and 24 so that the voltage appearing across the resistor 20 can be applied through a resistor 70 to the body. By the proper selection of circuit elements for a particular voltage source a variety of different voltages are available for testing various bodies. A voltmeter 72 may be connected between the wiper arm 16 and the terminal 32 for monitoring the applied voltage.

A heating circuit is provided for enabling the element or loop 48 to be cleaned. It is convenient to fabricate the element from a noble metal such as platinum since it has high electrical resistance and is not subject to oxide deposits thereon so that for the most part heating merely serves to remove organic contamination. Naturally, the element may be fabricated from other material to perform the function outlined herein. A double-pole, double-throw switch 74 has a pair of contacts 76 and 78 connected to the terminals of a secondary winding 80 of an iron-core transformer 82 through an on-off switch 83, and a pair of contacts 84 and 86 connected to the element. A primary winding 88 of the transformer is connected to an alternating current source 90. When the source is energized and the switches 74 and 83 are closed, approximately 6.3 volts are applied to the element for heating purposes.

During normal operation, the element 48 is cleaned and cooled prior to performing any tests. The element is positioned over the body 38 by moving the shaft 44. If the distance between the element and the body is minimized lesser magnitudes of voltage are required to have current flow between the element and the body so that initially the spacing between the body and the element may be determined by trial and error methods. An advantage of using low voltages is that the body being tested will not be marred or perhaps destroyed when current flows between the body and the element.

A body to be tested is normally inserted between the terminals 32 and 34, and after trial and error determinations, an optimum setting for wiper arms 16 and 18 in conjunction with selecting switch 56 or 58 can be established for a given spacing between the body and the element to have current flow between the body and the element. A number of possibilities are available for causing breakdown of the dielectric medium to occur at a particular applied voltage. Probably the most feasible method is to vary the setting of the wiper arm 18 while noting the indication of the voltmeter 50. For certain operations it may be preferable to adjust the spacing between the element and the body and not the magnitude of the applied voltage. When breakdown occurs, a direct short occurs across said voltmeter so that in reality interest will be centered on the indication just prior to that occurrence.

After cleaning and prior to any further processing, metal bodies may be tested to ascertain their surface condition. Bodies that do not conform to a prescribed standard can be sorted for further cleaning, whereas those that conform may be processed.

In one series of tests performed in the aforementioned manner, aluminum (24S-Ts) was subjected to 50-60 volts under a load of 20 megohms before breakdown of the dielectric medium occurred. After an oxide film was permitted to build up thereon, a voltage exceeding 100 volts under a load of 1000 megohms was required for breakdown. The presence of organic contamination also alters the voltage at which breakdown occurs, generally, requiring lower voltages. Thus, these tests disclosed the surface condition of metal bodies and the particular type of contamination of the surface.

It should be evident that the aforementioned method for qualitatively determining the surface condition of a metal body is an improvement in the art of surface testing and of immeasurable importance to the associated arts of processing metal bodies.

Having thus described the method of testing the surface condition of metal bodies many equivalents will immediately suggest themselves to persons skilled in the art without departing from the scope and spirit of the present invention. For example, in a more elaborate apparatus provision may be made for adjusting the spacing between the body and the element by applying weights thereto, or a calibrated mechanism may be provided for directly determining the spacing therebetween for any adjustment thereof. These embodiments, however, will not depart from the spirit and scope of the present invention. Accordingly, the invention should be given broad interpretation commensurate with the appended claims.

What is claimed is:

1. The method of ascertaining the surface condition of a series of electrically conductive bodies to determine their conformity or lack of conformity with a preselected standard of cleanliness which comprises the steps of positioning an electrically conductive testing element in spaced relation to said first conductive body to create an air gap therebetween, applying a direct current voltage to an electrical circuit including both said bodies, adjusting the magnitude of said voltage and the spacing between said bodies to have unidirectional current flow therebetween, measuring the voltage at which said last named current flows, and successively inserting all of the electrically conductive bodies to be tested, while maintaining said testing element in the adjusted space relationship with respect to the successively inserted bodies to be tested.

2. The method of ascertaining the surface condition of a metallic body which comprises the steps of positioning an electrically conductive testing element in spaced relation to said metallic body to create an air gap therebetween, applying a direct current voltage between said body and said electrically conductive testing element having a dielectric medium therebetween, adjusting the magnitude of said voltage and the opposition to current flow offered by said medium to have unidirectional current flow therebetween through said medium, measuring the voltage at which current flows for a given spacing between said body and said element, and successively placing said metallic bodies in the position first occupied by the first of said metallic bodies while maintaining said testing element in its adjusted position.

References Cited in the file of this patent

UNITED STATES PATENTS

| | | |
|---|---|---|
| 1,811,765 | Snelling | June 23, 1931 |
| 2,521,917 | Holliday et al. | Sept. 12, 1950 |
| 2,702,948 | Seney | Mar. 1, 1955 |
| 2,752,690 | Heath et al. | July 3, 1956 |
| 2,836,792 | Weber | May 27, 1958 |